(12) United States Patent
Smith et al.

(10) Patent No.: US 7,004,687 B2
(45) Date of Patent: Feb. 28, 2006

(54) HYDROTROPIC ADDITIVE FOR PROCESS WATER USED TO CONDITION AND STABILIZE SOILS AND OTHER BASE MATERIALS USED IN CONSTRUCTION

(75) Inventors: James W. Smith, Pantego, TX (US); Morris D. Key, Sherman, TX (US)

(73) Assignee: EnviroSpecialists, Inc., Fort Worth, TX (US)

( * ) Notice: Subject to any disclaimer, the term of this patent is extended or adjusted under 35 U.S.C. 154(b) by 0 days.

(21) Appl. No.: 10/744,941

(22) Filed: Dec. 22, 2003

(65) Prior Publication Data
US 2004/0191003 A1 Sep. 30, 2004

Related U.S. Application Data

(60) Provisional application No. 60/435,854, filed on Dec. 20, 2002.

(51) Int. Cl.
*B09B 1/00* (2006.01)
(52) U.S. Cl. ............ 405/264; 405/263; 252/88.1
(58) Field of Classification Search ........... 405/264, 405/263; 252/88.1
See application file for complete search history.

(56) References Cited

U.S. PATENT DOCUMENTS 4,737,305 A * 4/1988 Dohner .............. 252/88.1
5,223,165 A * 6/1993 Winstanley et al. ........ 299/12

* cited by examiner

*Primary Examiner*—John Kreck
(74) *Attorney, Agent, or Firm*—Gardere Wynne Sewell LLP

(57) ABSTRACT

Hydrotropic wetting agents enhance the activity of water for earthy materials by lowering surface tension to promote surface-to-surface contact, to neutralize the electric double layer, to destroy protective colloids, to neutralize other charged particles, and to bind water to the materials, thus, significantly reducing the evaporation rate and, concomitantly, reducing the amount of water that must be applied and the energy and time used to prepare the material. A wetting agent suitable for the present invention includes an alkylphenol ethoxylate (APE) and a polyglycol, such as, for example, glycerin or propylene glycol (when toxicity is not an issue), and an antifoaming agent, such as for example, a polysiloxane polymer. These chemicals combined in the concentration ranges of the present invention produce wetting agent/hydrotropic formulations that maybe used to provide the advantages of the present invention.

10 Claims, No Drawings

HYDROTROPIC ADDITIVE FOR PROCESS WATER USED TO CONDITION AND STABILIZE SOILS AND OTHER BASE MATERIALS USED IN CONSTRUCTION

CROSS REFERENCE TO RELATED APPLICATIONS

The present application claims priority to Provisional Application Ser. No. 60/435,854, filed Dec. 20, 2002, titled WETTING AGENT/MOISTURE CONTROL FORMULATION, which is hereby incorporated by reference.

BACKGROUND OF THE INVENTION

It is known in the construction arts that water must be applied to base materials and/or soils when preparing foundations for buildings, roads, and similar construction projects. Often, especially during hot, dry weather, materials require substantial amounts of water to adsorb and absorb sufficient moisture for compaction to specified densities. Sorbed moisture levels specified for a given project depend upon the nature of the base material and the degree of compaction needed to make a stable base, whereas the amount of water applied to achieve the required amount sorbed depends on the rate at which liquid migrates through pore spaces among particles, the rate at which water penetrates into particles, and the evaporation rate.

Water is normally distributed by a water truck, being sprayed on the material from a trailer pulled by a tractor rig. Base materials and soils must be kept at appropriate moisture levels for periods as long as several days, until the base material is thoroughly wetted and settled and/or in condition for compaction. Costs of water, as well as the equipment and labor costs for distributing the water are significant.

It is useful to provide a method of treatment that reduces the amount of water and time required for conditioning roadbeds and foundation materials and for stabilizing soils. It is further desirable that such product and method decrease the frequency of applications in order to decrease the rate of fugitive water loss by the application process itself.

SUMMARY OF THE INVENTION

In accordance with the present invention, water used to prepare a roadbed, building or other foundation, or for soil stabilization is mixed with a hydrotropic wetting agent having desired properties. The hydrotropic wetting agent enhances the activity of water for earthy materials by lowering surface tension to promote surface-to-surface contact, to neutralize the electric double layer, to destroy protective colloids, to neutralize other charged particles, and to bind water to the materials, thus, significantly reducing the evaporation rate and, concomitantly, reducing the amount of water that must be applied and the energy and time used to prepare the material. A wetting agent suitable for the present invention includes an alkylphenol ethoxylate (APE), such as, for example Tergitol, and a polyglycol, such as, for example, glycerin or propylene glycol (when toxicity is not an issue), and an antifoaming agent, such as for example, a polysiloxane polymer. These chemicals combined in the concentration ranges of the present invention produce wetting agent/hydrotropic formulations that may be used to provide the advantages of the present invention.

DETAILED DESCRIPTION OF THE INVENTION

Many factors affect the water-demand of foundation base materials and/or soils. This water demand is due in large part to the rate of particle hydration and, once hydrated, the ability of base particles to retain moisture and agglomerate. The mineralogy, particle-size-distribution, degree of hydration prior to delivery to the site, and ambient weather conditions are among the important factors involved in water demand for base preparation.

One form of the present invention uses a combination of surfactants and hygroscopic compounds mixed with water to stabilize and prepare a roadbed, building foundation, or soil to be settled for whatever purpose. Use of this "hydrotrope", or hydrotropic wetting agent, allows for significantly less water to be used in the preparation process, less time required to condition the material, thus saving costs for the water itself, the labor, energy, environmental control and equipment costs required to apply it.

Methods of the present invention may increase the sorption rates and holding capacities of earthy materials for water and thus decrease the amount of water that must be applied, and the time required to achieve a given level of sorbed moisture, when compared with treatment by water alone.

The use of a hydrotropic wetting agent as described by the present application typically includes an APE surfactant combined with other agents, such as glycerin or propylene glycol, and an antifoaming agent that induce rapid migration of the water/hydrotrope by virtue of the combined effect of lowered surface tension and hygroscopicity. A specific surfactant suitable for use in the present invention is Tergitol™ TMN-10. The surfactant concentration range is typically from about 10% to about 50% by volume in deionized water containing, a glycol, such as, for example, glycerin in the range from about 0.1% to about 10% by volume, and an anti-foaming agent, such as for example, a polysiloxane polymer, in the range of about 0.5 to about 5% by volume.

This formulation results in a hydrotropic concentrate that when added to water in a wide range of use dilutions, provides the water for conditioning the roadbed or foundation. The resultant hydrotrope may be mixed with water in a ratio of between approximately 10–1000 ppm to give a product that can be applied directly to the roadbed, foundation, or soil. The water is applied in the same manner as is presently done in the art, but the difference in effect is that the bed attains its desired conditioning faster than normal and retains its adsorbed and absorbed water longer. Thereby, less water must be applied to achieve moisture levels sought faster, and remaining moist longer. Thus, water is applied less often. Field tests indicate that approximately half as much water is required in tight, clayey soils as is usually applied without the hydrotrope. As little as one-third the water is required using the present invention in water applied to a crushed concrete flexible base.

A formulation useful with the present invention uses a non-toxic polyglycol or glycerin in addition to the Tergitol. The active components of this invention in its concentrated form are (1) Tergitol™ TMN-10,10–40% v/v (2) glycerin (or polyglycols), 10–40%, (3) water, 17–77% v/v, and a silicone-based anti-foaming agent, 0.1–3%. This concentrate is mixed at a ratio of between 10–1000 ppm with the water sprayed on the roadbed, foundation, or soil bed in order to provide the benefits described. A ratio in this range can be achieved, for example, by mixing the described formulation, as available from EnviroSpecialists as the product EWO, in the ratio of between 1.5 fl ozs and 10 gals of concentrate to 10,000 gals water, dependent on the type of roadbed material, temperature, and humidity. A typical hydrotrope—water formulation for most roadbed materials is 1.5 gals of EnviroSpecialists' Enviro RoadMoisture™ per 3400 gallons of water in a tank truck.

This formulation may be provided in a concentrate that can be conveniently transported to a site where a road or foundation bed is to be prepared, then diluted with large amounts of water, often by adding the concentrate to a water tank truck, to provide the described properties, which are far superior to those of water alone.

The present invention utilizes a combination of wetting agents, surfactants and anti-foaming agent, and a hygroscopic agent carried in water to produce a hydrotropic agent that activates water and small particles by interfering with water-to-water hydrogen bonding and neutralizing electric double-layers, thus destroying protective colloids, and spreading over particles, increasing their ability to agglomerate.

In use, treated water is spread on a roadbed, foundation bed, or the like using the same techniques currently used with plain water. Additional water will not need to be added as often as is currently the case, so the operator will need to check on the moisture content remaining in the soil from time to time, or modify application schedules used for plain water application. Treated water can be applied using water trucks, various types of sprayers, or hoses as desired. Typically, the same application technique is used with the present invention as with untreated water, except that lesser amounts of water are required over the course of the bed preparation stage.

Once the treated water has been applied, the bed can be allowed to settle naturally, or be compacted mechanically, as desired. Often, both techniques will be employed. Treated water can continue to be applied during and after mechanical compaction as known in the art, with the difference that less water is required. In general, the operator should monitor the moisture levels in the soil of the bed being prepared so as to avoid over wetting, with its attendant additional costs and delays.

While the invention has been particularly shown and described with reference to the above-described example, it will be understood by those skilled in the art that various changes in form and detail may be made therein without departing from the spirit and scope of the invention.

What is claimed is:

1. A method for stabilizing soil comprising the steps of: contacting an effective amount of a composition comprising an alkylphenol ethoxylate surfactant, polyglycol, an anti-foaming agent and water with soil.

2. The method of claim 1, wherein the anti-foaming agent is a siloxane polymer.

3. The method of claim 1, wherein the polyglycol is glycerin or propylene glycol or a mixture thereof.

4. The method of claim 1, wherein the concentration of the surfactant is between about 10% and about 50% by volume.

5. The method of claim 1, wherein the concentration of polyglycol is between about 0.1% and 10% by volume.

6. The method of claim 1, wherein the concentration of anti-foaming agent is between about 0.1% and 5% by volume.

7. The method of claim 1, wherein the composition further comprises one or more adjuvants.

8. The method of claim 1, wherein the contacting step is accomplished using a water truck.

9. The method of claim 1, wherein the contacting step is accomplished using a nozzle.

10. The method of claim 1, further comprising the step of mechanical compaction of the soil.

\* \* \* \* \*